Figure 1:
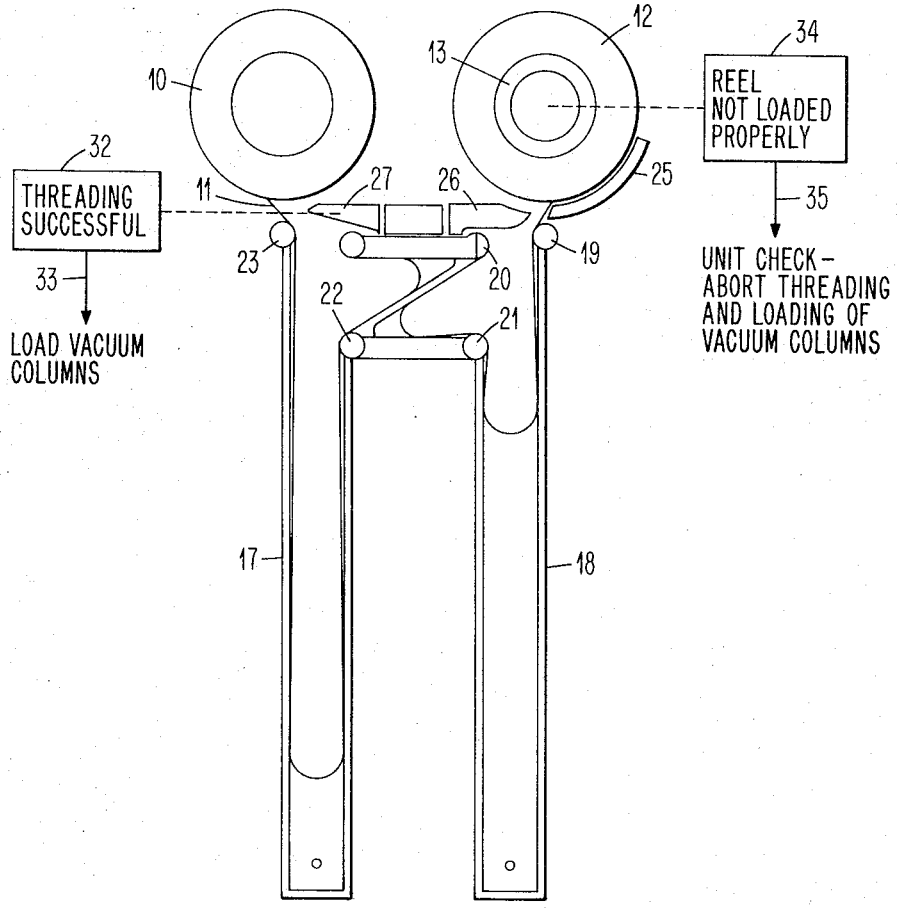
Figure 2:
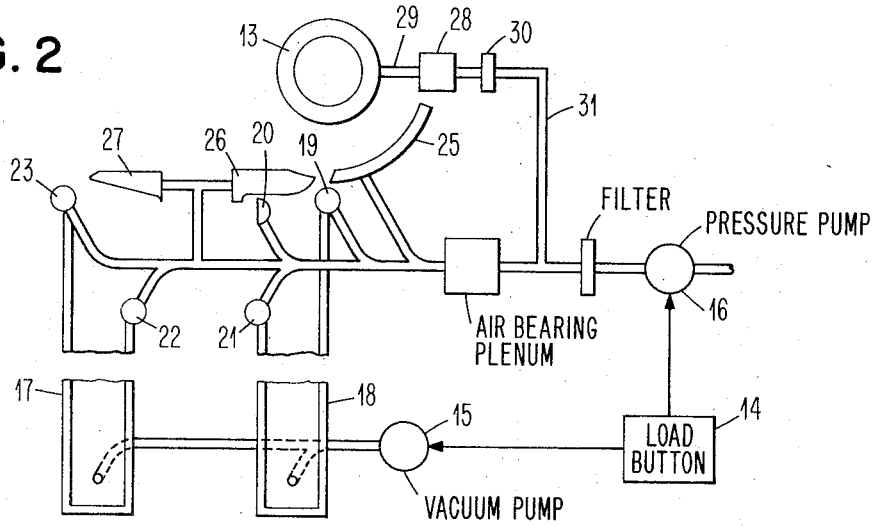
Figure 3:
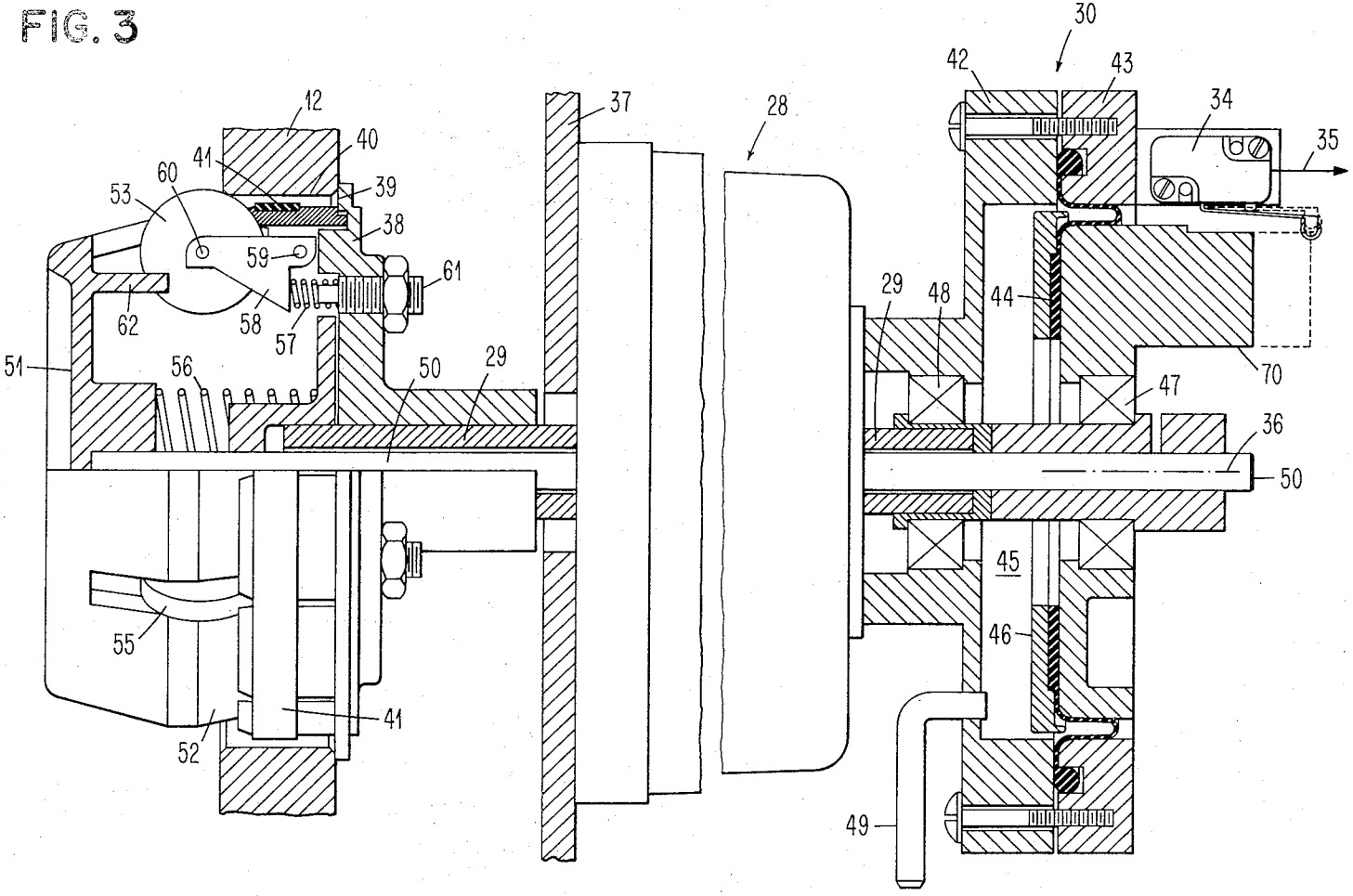
Figure 4:
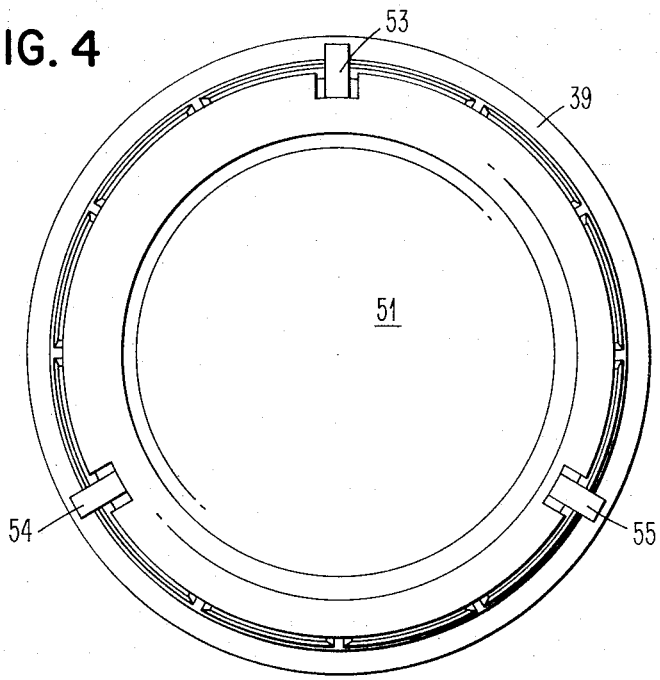
Figure 5:
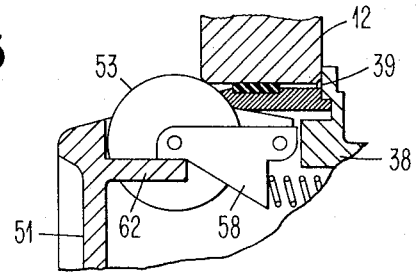
Figure 6:
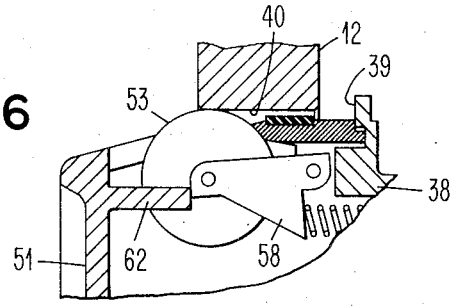

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 5, 1974

920 O.G. 7

T920,004

MAGNETIC TAPE UNIT HAVING AN AUTOMATIC REEL LATCH AND MEANS FOR SENSING IMPROPER LOADING OF A TAPE REEL

Everette R. McCully, Northglenn, and William J. Schaffer, Loveland, Colo., assignors to International Business Machines Corporation, Armonk, N.Y.

Filed Dec. 22, 1972, Ser. No. 317,875
Int. Cl. G11b *15/66;* B65h *19/02*
U.S. Cl. 242—68.3
3 Sheets Drawing. 22 Pages Specification

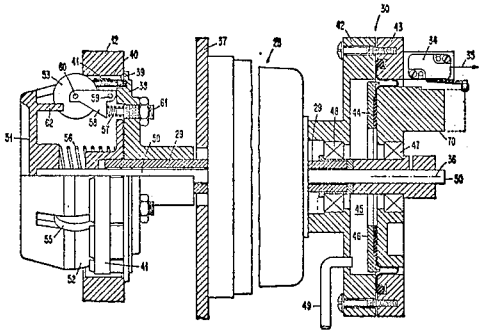

A magnetic tape unit includes a source of positive air pressure for use with components such as air bearings and the pneumatic motor of an automatic reel latch.

MAGNETIC TAPE UNIT HAVING AN AUTOMATIC REEL LATCH AND MEANS FOR SENSING IMPROPER LOADING OF A TAPE REEL

Filed Dec. 22, 1972 3 Sheets-Sheet 1